3,233,017
REFRACTORY PROCEDURES
Ernest P. Weaver and Ben Davies, Pittsburgh, Pa., assignors to Harbison-Walker Refractories Company, Pittsburgh, Pa., a corporation of Pennsylvania
No Drawing. Filed Aug. 14, 1963, Ser. No. 302,002
The portion of the term of the patent subsequent to Feb. 2, 1982, has been disclaimed
6 Claims. (Cl. 264—63)

This invention relates to refractory brick particularly suited for use in lining vessels for the oxygen steelmaking process. In a particular embodiment, it relates to novel practices in the treating of tar bonded basic refractories.

Variants of the oxygen blowing process, which is of contemporary origin, have been referred to as the LD process, the Kaldo process, the rotor process, and the oxygen converter process. A basic slag is used, requiring the use of basic refractories to resist corrosion. Since the advent of these processes, continuous experimentation has produced refractories giving longer service life. The principal basic refractories of industry include products of dead burned magnesite or magnesia (MgO) or dead burned dolomite (CaO·MgO). Refractories made of lime (CaO) have also been proposed because of the extreme refractoriness of lime, but its extreme tendency to hydrate upon exposure to the moisture of the air has limited its use.

In the majority of operations where steel is made by the oxygen converter process, unburned brick of dead burned dolomite sometimes (in fact, usually) mixed with dead burned magnesite, and often some lime as well, are bonded with a pitch or tar and used to form the molten metal contacting portion of the vessel lining. As is well known in the art, dead burned dolomite hydrates quite readily in the presence of moisture. The pitch or tar serves at least two functions: (1) provides the bond for the refractory particles, and (2) aids in inhibiting the hydration of the dead burned dolomite by forming a moisture-resistant coating on the grains. To further improve the hydration resistance of these brick, the blends of dead burned dolomite and magnesia have been used as have blends of dead burned stabilized dolomite with unstabilized dolomite.

The tar or pitch contributes still another useful property to the refractory body, that is, the ability to better resist the chemical attack of the slag present in the vessel during the steel making process. Experience has shown that, when brick which are bonded with tar or pitch or other nonaqueous, cokable, carbonaceous material are heated in service, these bonding materials are decomposed and carbon is deposited within the pores and around the grains of the refractory material. Laboratory studies and service experience in the oxygen converter have shown the value of increased carbon content in the lining material.

The actual techniques of the manufacture of tar bonded brick have been replete with problems. Some techniques have required the maintenance of a tar bonding agent and refractory material batch at an elevated temperature during forming. For example, the Canadian patent to Hodnett, No. 614,742, issued February 14, 1961, discloses such a technique. However, brick made according to such techniques are not as strong as might be desired. In copending application Serial No. 152,149, owned by the same assignee as the instant invention, there is disclosed and claimed a novel and greatly improved baking procedure by which improved, tar bonded, basic refractory brick of good hydration resistance can be manufactured. However, particularly with the advent of extremely large oxygen blowing process vessels, the strength of tar bonded brick made according to such prior techniques sometimes may be lacking. When one considers the immense weight of refractory which the lower courses of the lining of an oxygen blowing process vessel must support, the problem becomes readily apparent. In some of the newer vessels, the pressure on them exceeds 40 p.s.i. Thus, particularly during burn-in, brick in the lower courses may undesirably subside. If subsidence amounts to more than about 2%, the brick may shrink away from the vessel allowing molten metal penetration.

Accordingly, it is an object of this invention to provide improved refractory practices for the manufacture of tar bonded basic refractories of much higher strength under load than has been heretofore possible. It is another object of the invention to provide a method of manufacturing tar bonded basic refractories of improved high temperature strength using presently available equipment.

According to the present invention, there is provided an improved method of making tar bonded basic refractory shapes from a batch consisting of size graded basic refractory grain and selected nonaqueous, cokable, carbonaceous bonding materials. An exemplary mix may be comprised of size graded magnesite in which about 30% passes a 4 mesh and rests on a 10 mesh screen, about 30% passes a 10 mesh and rests on a 28 mesh screen, with the remaining 40% being —28 mesh. Also acceptable are commonly used mixtures of magnesite and dolomite such as one which consists of about 60 parts of stabilized dolomite in the coarser range (+28 or 35 mesh), and about 40 parts magnesite in the finer range (—28 or —35 mesh). It is desirable that about 95% of the finer or nominally —28 mesh material be ball mill fines (nominally —65 mesh with 50 to 60% thereof passing a 150 mesh screen). From about 5 to about 6 parts, by weight, of either powdered hard pitch or a mixture of powdered hard pitch and medium pitch are added to the size graded refractory batch. These materials are intimately admixed. The resulting mixture is formed into shapes on a hydraulic press at about 8000 p.s.i.; which brick are subsequently placed in a brick dryer having a dessicated atmosphere and heated to between about 350 to 450° F. At 350° F. a hold time of at least about 72 hours is necessary, at 400° to 450° F. at least about 13 hours is required. After the hold time, the brick are cooled and are ready for use.

The following specific examples detail suggested mixes and steps for optimum results. Example I sets forth the preferred embodiment of the invention.

*Example I*

About 100 parts of a size graded magnesite, of about the following screen analysis: 30% —4 +10 mesh, 30% —10 +28 mesh, with the remainder —28 mesh and in which about 60% of the —28 mesh material is +150 mesh, is mixed with about 6 parts, by weight, of powdered hard pitch. The pitch and magnesite are intimately admixed and formed into shapes. For best results, this mix is heated to a temperature of about 500° F. (to make the hard pitch flow) and formed on a mechanical brick press at 8000 p.s.i. These shapes are placed in a conventional brick dryer and heated to about 400° F. A conventional dryer can be used here because the magnesite is less susceptible to hydration. This 400° F. temperature is maintained for 13 to 16 hours. Brick made in this manner had a crushing strength which averaged 4040 p.s.i. (while still hot from the dryer). In a load test in which they were rapidly heated to 1000° F. under a 50 p.s.i. load, which temperature was maintained for about two hours, these brick had a mere 0.2% subsidence.

Example II

A batch is made using about 100 parts of the same size graded magnesite as discussed under Example I, but in which about 2 parts of medium pitch and about 4 parts of powdered hard pitch are used for bonding. The batch is manufactured into shapes in the same manner as discussed under Example I, except the batch is heated only to 400° F. for forming. These brick, immediately after removal from the dryer, had a crushing strength of almost 3000 p.s.i.

Brick thus made, in the load test, under 50 p.s.i. pressure at 1000° F. and a 2-hour hold, had a 0.4% subsidence.

Example III

A batch using 100 parts of the same magnesite as discussed above under Examples I and II, to which is added about 4 parts of medium pitch, and about 2 parts of powdered hard pitch. This mixture need be heated only to about 250° F. to form. The resulting shapes are otherwise manufactured in the same manner as discussed under Examples I and II, and treated to the same 400° F. heat treatment. The resulting shapes, immediately after removal from the dryer, had a crushing strength of 2800 p.s.i., and in the load test (50 p.s.i. load, 1000° F., 2-hour hold) had a subsidence slightly over 0.2%.

In comparative tests, the Examples I, II, and III batches were prepared and made into shapes and put into the same dryer, except the hold temperature was only 200° F., although this temperature was maintained for the same 16-hour period. In the same load test (560 p.s.i. load, 1000° F., 2-hour hold) all specimens failed before the 1000° F. temperature was reached.

The following are typical characteristics of pitches used in the examples: For the medium pitch, the softening point (cube in water), 150° to 155° F.; for the hard pitch, the values are: softening point (cube in water), 305° F.

When the Examples II and III tests were repeated using up to about 2% creosote instead of the medium pitch, results were substantially the same, as far as strength at elevated temperature, as determined under the same load test discussed above. Thus, 2% creosote can be used instead of or in addition to medium pitch. The total, however, of the mixture cannot exceed about 6% by weight, based on the weight of the solids.

As a general rule, the art divides tars and pitches into three categories, i.e., soft pitch, which softens between 80 and 100° F.; medium pitch which has a softening point between 150 and 250° F.; and hard pitch, which has a softening point within the range 275 and 450° F. In the discussion above and hereafter, by "hard pitch" we refer to that third group which softens between 275 and 450° F. This material should constitute at least 2 parts of the 5 to 6 parts of the carbonaceous bonding material which is used with the mix. The remainder of the bonding material can be medium bonding pitch or up to 2% of the creosote.

The above examples clearly established that brick, according to the invention, are well able to resist the 50 p.s.i. load, which will be found in the lower courses of larger oxygen converter vessels. By lower courses, we mean about the lower quarter of the height of the barrel of such a vessel.

In the examples, for sake of brevity of explanation, we mentioned that a batch was all size graded magnesite. As a practical matter, we used a mixture of two different magnesites in the laboratory, for convenience. The —65 mesh ball mill fine fraction analyzed about 98% MgO, 0.7% $SiO_2$, 0.9% CaO, 0.3% $Al_2O_3$, and 0.3% $Fe_2O_3$. The coarser +28 mesh fraction had a higher lime content and analyzed about 72% MgO, 15% CaO, 7.1% $Fe_2O_3$, 5% $SiO_2$, and about .9% $Al_2O_3$. This latter magnesite is commercially made by dead burning a commercial ore.

A workable range for heat treating the brick of this invention is from at least 350 to no more than 450° F. As 350° F. is approached and passed, the process is less economical, i.e. at 350° F. heat treatment would have to be maintained for roughly 72 hours to obtain the desired treatment. As 450° F. is approached and passed, the carbonaceous bond oxidizes and becomes less effective. We consider 400° F.± about 10° F. to be the optimum temperature. We consider at least 16 hours to be the optimum time period for heat treatment at this temperature. Our tests show that as long as the powdered hard pitch amounts to about 2 parts of the 5 to 6 part bonding mixture, a hot crushing strength of over 1500 p.s.i. can be obtained in as short a period as about 13 hours.

The actual phenomenon, by which our heat-treating procedures obtain such greatly increased hot strength for tar bonded refractories, is not entirely understood. However, we know that the temperature range 350 to 450 induces volatilization of up to about 1% of the total bar bonding agent mixture. We also know that polymerization occurs in the residual carbonaceous bonding material, resulting in an increasingly viscous bond about the refractory. It appears that during an initial period of the heat treatment in which all of the carbonaceous bonding agent is liquified, or at least brought to a stage of fluidity, that it penetrates the pores of the coarser particles; and that as the heating continues, the material which has penetrated the particles undergoes polymerization together with the bond in the interstitial areas between grains, thereby producing an extremely strong system to hold the refractory particles together. It would, thus, appear our heat treatment has three functions:

A. It serves to volatilize off the lower boiling point organic materials present in the bonding agents, which would tend to flame and be destroyed in service very rapidly, thereby providing little or no protection for the refractory grain.

B. It tends to cause penetration of the pores of at least the coarse particles of the refractory material, still further reducing surface exposed to possible hydration. (It may also penetrate pores in the finer —65 mesh material.)

C. It initiates substantial polymerization, which occurs in the carbonaceous bonding material which is used.

As mentioned above, according to this invention, 5 to 6%, by weight, of carbonaceous bonding material is added to the refractory. In other tests, we repeated Examples I, II and III above, but medium pitch was added to increase the total cokable carbonaceous bonds to 6.7% and 7%. Brick were made from these batches and heat treated according to the invention, and made in a manner otherwise as discussed in Examples I, II, and III. These brick all failed in the load test at 1000° F. under a 50 p.s.i. load.

In still another series of tests, the same grain as described in Examples I, II, and III was used with 6 parts of medium pitch as the bonding agent to make brick. These brick were not as strong as those with the hard pitch, in the bonding system. In the 1000° F., 50 p.s.i., 2-hour hold subsidence test, less than 1% subsidence occurred. Thus, medium pitch alone can be used. However, creosote should not be used with the all medium pitch bonding system since the resulting brick are too sticky.

Another way to describe the time period necessary, at a given temperature, is to state that a temperature in the range 350 to 450° F. is held only along enough to provide sufficient strength in a brick according to the invention, as to enable it to resist a 50 p.s.i. load at 1000° F. for two hours with no more than about 1% subsidence. Brick, having a subsidence up to about 2 to 3%, are probably satisfactory for many uses, and can be made according to the method of this invention; but we prefer that the temperature be held long enough to develop strength so the subsidence will be less than 1%, in the test just described.

In the foregoing discussion, all parts and percentages are by weight, all chemical analyses are on the basis of an oxide analysis, in compliance with the usual practice of reporting the chemical analysis of refractory materials. All sieve sizes are according to the Tyler standard series of screens. We also wish it understood that analyses and sizings are only typical.

Having thus described the invention in detail and with sufficient particularity as to enable those skilled in the art to practice it, what is desired to have protected by letters patent is set forth in the following claims.

We claim:
1. The method of manufacturing tar bonded basic refractory material having improved strength consisting essentially of fabricating a batch of basic refractory material, mixing this material with from 5–6 parts, by weight, based on the weight of the refractory of medium pitch, forming the resulting batch into shapes, heating the shapes to a temperature between 350 and 450° F., maintaining this temperature until the refractory material develops sufficient strength to resist a 50 p.s.i. load at 1000° F. for two hours with less than about 3% subsidence.

2. Method of manufacturing tar bonded basic refractory material having improved strength consisting essentially of fabricating a batch of basic refractory material, mixing this material with from 5 to 6 parts, by weight, based on the weight of the refractory, of a cokable carbonaceous bonding material, said cokable carbonaceous bonding agent consisting of creosote in an amount from 0 to 2 parts, by weight, based on the total weight of refractory, and nonaqueous, cokable, carbonaceous material which is selected from the group consisting of hard pitch and medium pitch, but in which the hard pitch is equal to at least 2 parts, by weight, of the total bonding material, also based on the total weight of the refractory, forming the resulting batch into shapes, heating the shapes to a temperature between 350 and 450° F., maintaining this temperature until the refractory material develops sufficient strength to resist a 50 p.s.i. load at 1000° F. for two hours with less than about 3% subsidence.

3. The method of claim 2 in which the temperature is 400° F.

4. The method of claim 2 in which a temperature of 390 to 410° F. is maintained for about 16 hours.

5. The method of claim 2 in which the refractory material is selected from the group dead burned dolomite and dead burned magnesite.

6. Method of manufacturing tar bonded basic refractory material having improved strength consisting essentially of fabricating a batch of basic refractory material, mixing said batch with from 5 to 6 parts, by weight, based on the weight of the refractory material of nonaqueous, carbonaceous bonding material, said bonding material consisting of creosote in an amount from 0 to 2 parts, by weight, based on the total weight of refractory material, and nonaqueous, cokable, carbonaceous material which is selected from the group consisting of hard pitch, and mixtures of medium pitch and hard pitch, but in which the hard pitch is equal to at least about 2 parts, by weight, of the total bonding material also based on the total weight of the refractory material, forming the resulting batch into shapes, heating the shapes to a temperature between 350 and 450° F., maintaining this temperature until the refractory material develops sufficient strength to resist a 50 p.s.i. load at 1000° F. for two hours with no more than about 1% subsidence.

References Cited by the Examiner

UNITED STATES PATENTS

| | | | |
|---|---|---|---|
| 3,015,850 | 1/1962 | Rusoff | 264—29 |
| 3,044,889 | 7/1962 | Ekedahl | 106—58 |
| 3,070,449 | 12/1962 | Davies | 106—61 |
| 3,092,437 | 6/1963 | Carter | 264—29 |

ROBERT F. WHITE, *Primary Examiner.*

ALEXANDER H. BRODMERKEL, *Examiner.*

R. B. MOFFITT, *Assistant Examiner.*